(12) United States Patent
Kuo et al.

(10) Patent No.: US 7,697,271 B2
(45) Date of Patent: Apr. 13, 2010

(54) PORTABLE COMPUTER ENCLOSURE

(75) Inventors: Szu-Wei Kuo, Taipei Hsien (TW);
Xiang Yu, Shenzhen (CN); Juan Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 451 days.

(21) Appl. No.: 11/614,984

(22) Filed: Dec. 22, 2006

(65) Prior Publication Data
US 2007/0153464 A1 Jul. 5, 2007

(30) Foreign Application Priority Data
Jan. 4, 2006 (CN) .......................... 2006 2 0053363

(51) Int. Cl.
*H05K 7/12* (2006.01)

(52) U.S. Cl. ...................... 361/679.21; 248/917; 349/58

(58) Field of Classification Search ............ 361/679.26, 361/679.21; 248/917; 349/58
See application file for complete search history.

(56) References Cited

U.S. PATENT DOCUMENTS

| 5,570,267 | A | * | 10/1996 | Ma | 361/679.21 |
| 5,768,095 | A | * | 6/1998 | Nakamura et al. | 361/679.09 |
| 5,953,206 | A | * | 9/1999 | Jondrow | 361/679.26 |
| 6,816,366 | B2 | | 11/2004 | Ko | |
| 2005/0213291 | A1 | | 9/2005 | Chi | |
| 2006/0002060 | A1 | * | 1/2006 | Ling | 361/679 |
| 2006/0050474 | A1 | * | 3/2006 | Kusaka et al. | 361/683 |

* cited by examiner

*Primary Examiner*—Jayprakash N Gandhi
*Assistant Examiner*—Ingrid Wright
(74) *Attorney, Agent, or Firm*—Wei Te Chung

(57) ABSTRACT

A portable computer enclosure includes a main body, a cover body pivotably attached to the main body, and an outer plate detachably attached to the cover body for covering an outer surface of the cover body opposite to the main body. The cover body defines at least one opening therein, and the outer plate forms at least one latch detachably engaging in the at least one opening in the cover body.

14 Claims, 6 Drawing Sheets

PORTABLE COMPUTER ENCLOSURE

BACKGROUND OF THE INVENTION

1. Field of the Invention

The present invention relates to portable computers, and more particularly to a portable computer with a replaceable enclosure.

2. Description of Related Art

Along with rapid development of electronic technology, performance of computers is enhanced day by day. A new computer can quickly become out-of-date. In order to keep up with technology, computers should be upgraded frequently.

To upgrade a computer means to change some internal components of the computer and thus enhance the performance of the computer. Upgrades help prolong the useful life of a computer. However, the appearance of the computer is usually not upgraded and will appear 'old-fashioned' to users when compared with the latest computers on the market. It is a waste to replace a computer only because of its appearance.

Accordingly, a need exists for a portable computer with a replaceable casing to resolve the above mentioned problem.

SUMMARY OF THE INVENTION

According to one aspect, a portable computer enclosure includes a main body, a cover body pivotably attached to the main body, and an outer plate detachably attached to the cover body for covering the cover body is presented. The cover body defines at least one opening therein, and the outer plate forms at least one latch detachably engaging in the at least one opening in the cover body.

According to another aspect, a portable computer includes a main frame, a display pivotably attached to the main frame, a casing detachably secured to an outer surface of the display by at least one screw, an anti-EMI layer coated on an inner surface of the casing. The casing is detachable from the display by removing the at least one screw.

Other systems, methods, features, and advantages of the present enclosure will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF THE DRAWINGS

Many aspects of the present portable computer can be better understood with reference to the following drawings. The components in the drawings are not necessarily drawn to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe the preferred embodiments of the present portable computer enclosure, in detail.

Figure 1:
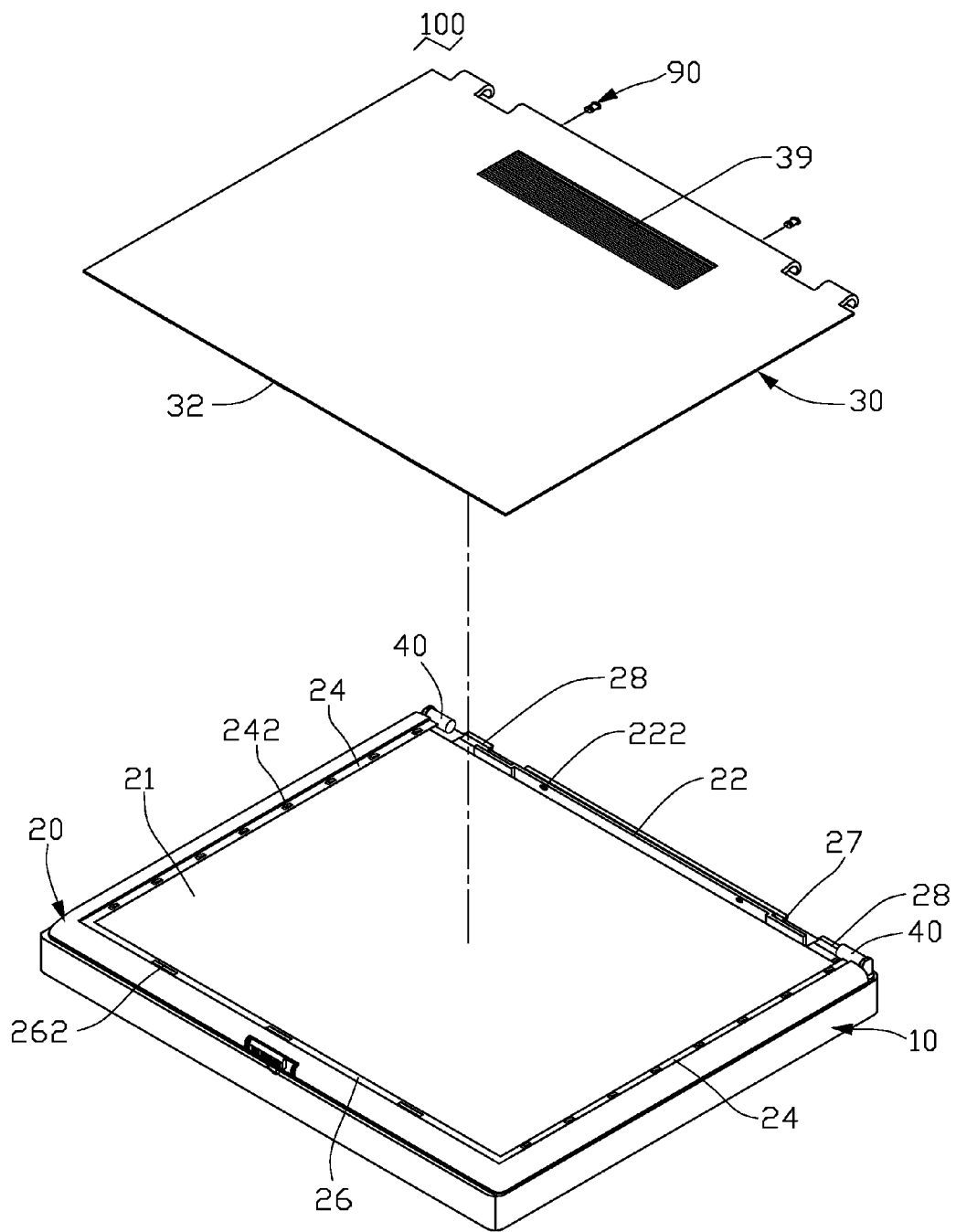
FIG. 1 is an exploded, isometric view of a portable computer in accordance with an exemplary embodiment, the portable computer including a main body, a cover body, and an outer plate.

Referring to FIG. 1, a portable computer 100 in accordance with an embodiment is illustrated. The portable computer 100 includes a main body 10, a cover body 20 pivotably attached to the main body 10, an outer plate 30 detachably attached to the cover body 20, and a pair of shafts 40. The main body 10 functions as a main frame of the portable computer 100, and the cover body 20 in which an LCD panel facing the main body 10 is mounted functions as a display. The outer plate 30 covers the cover body 10 for enclosing an outer surface of the cover body 20. The shafts 40 pivot the main body 10 and the cover body 20.

The cover body 20 defines a rectangular recess 21 with a similar shape to that of the outer plate 30. A mounting portion 22 extends upward behind the recess 21 for engaging with the outer plate 30. A pair of side strips 24 extends in from lateral sides of the recess 21, and a front strip 26 extends in from a front of the recess 21. A pair of shielding portions 27 extends up from the back of the recess 21, adjacent to opposite sides of the mounting portion 22. A pair of engaging tongues 28 extends back from the back of the recess 21. The mounting portion 22, the side strips 24, the front strips 26, the shielding portions 27, and the engaging tongues 28 surround the recess 21.

The mounting portion 22 defines a pair of screw holes 222 therein, and the front strip 26 defines three openings 262 therein. Each of the side strips 24 comprises a plurality of cantilever resilient fingers 242 extending therefrom. Free ends of the resilient fingers 242 extend forward and upward, and can provide restoration forces when being pressed downward.

Figure 2:
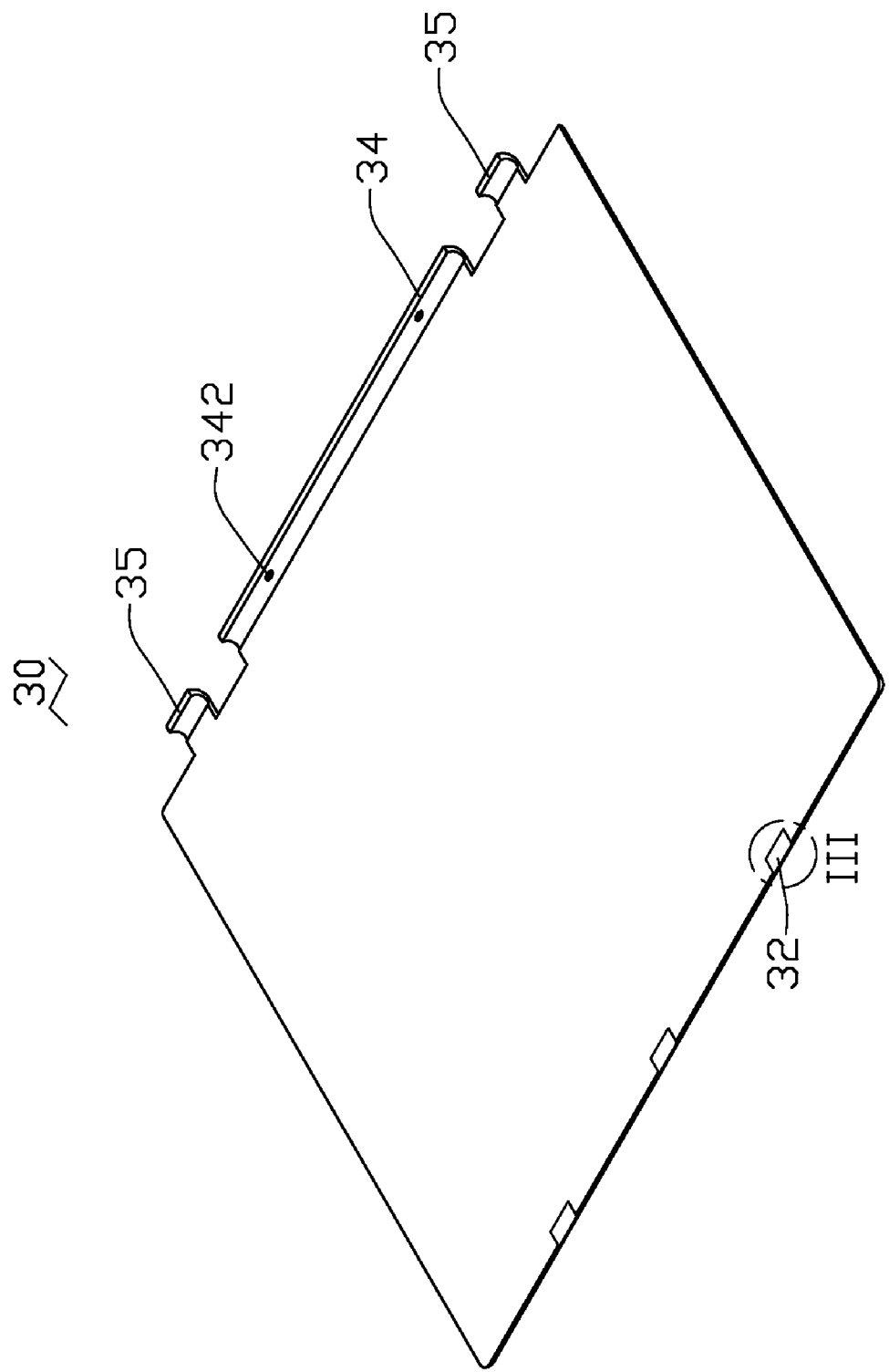
FIG. 2 is an inverted isometric view of the outer plate of FIG. 1, the outer plate including a plurality of latches.

Referring also to FIG. 2, the outer plate 30 forms a mounting flange 34 and a pair of engaging flanges 35 at a back thereof. The mounting flange 34 corresponds to the mounting portion 22 of the cover body 20, and defines a pair of through holes 342 corresponding to the screw holes 222. The engaging flanges 35 are located at two sides of the mounting flange 34, respectively corresponding to the engaging tongues 28 of the cover body 20. The engaging flange 35 and the corresponding engaging tongue 28 together construct an annular receiving configuration to receive the corresponding shaft 40 therebetween. Three latches 32 are formed at a front of an inner surface of the outer plate 30, corresponding to the openings 262 in the cover body 20. On an outer surface of the outer plate 30, a plurality of anti-slip strips 39 are formed, near the back of the outer plate 30.

Figure 3:
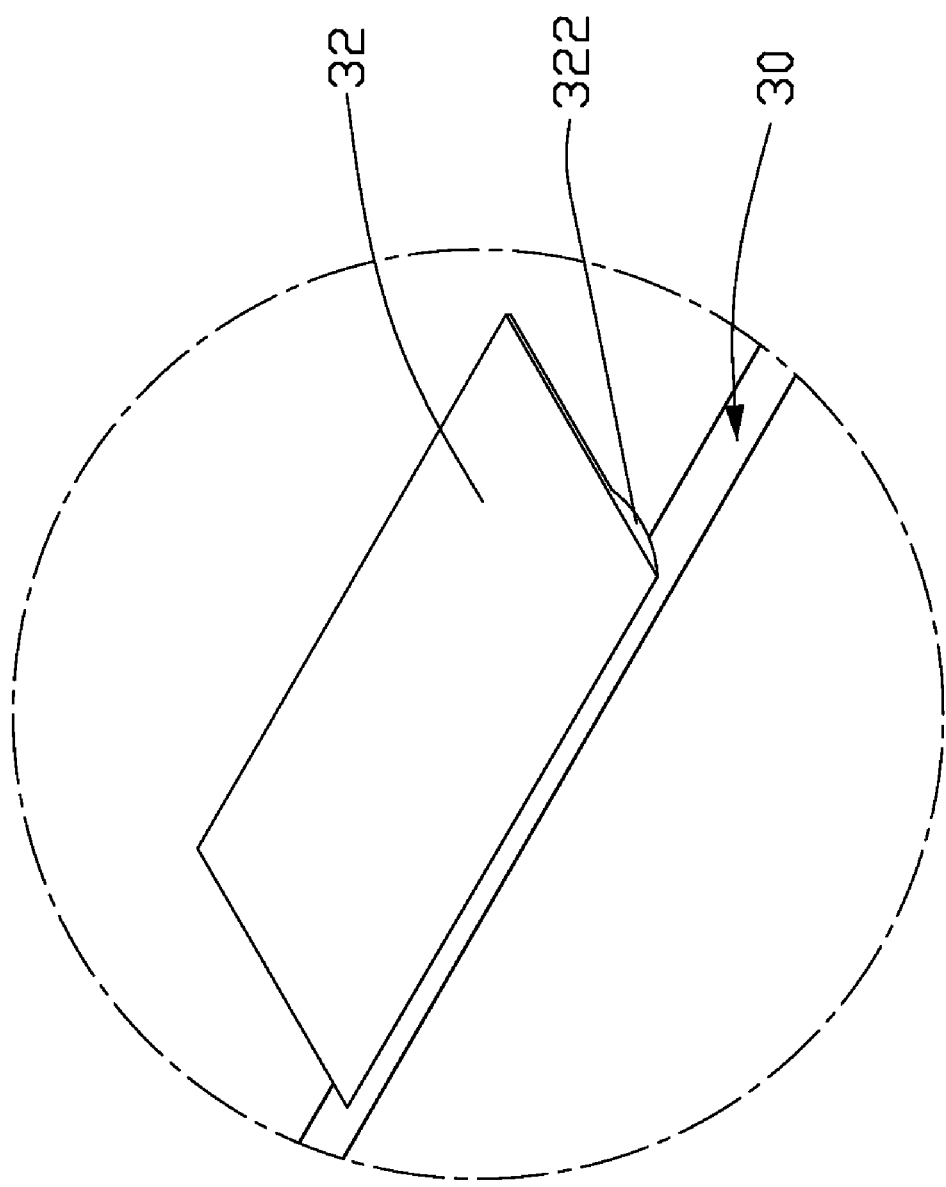
FIG. 3 is an enlarged view of a circled portion III in FIG. 2.

Referring to FIG. 3, an enlarged view of one of the latches 32 is illustrated. Each of the latches 32 extends forward from the inner surface of the outer plate 30. Each of free ends of the latches 32 forms a protrusion 322 extending toward the outer plate 30. The protrusions 322 are engagable in the openings 262 in the front strip 26.

Figure 4:
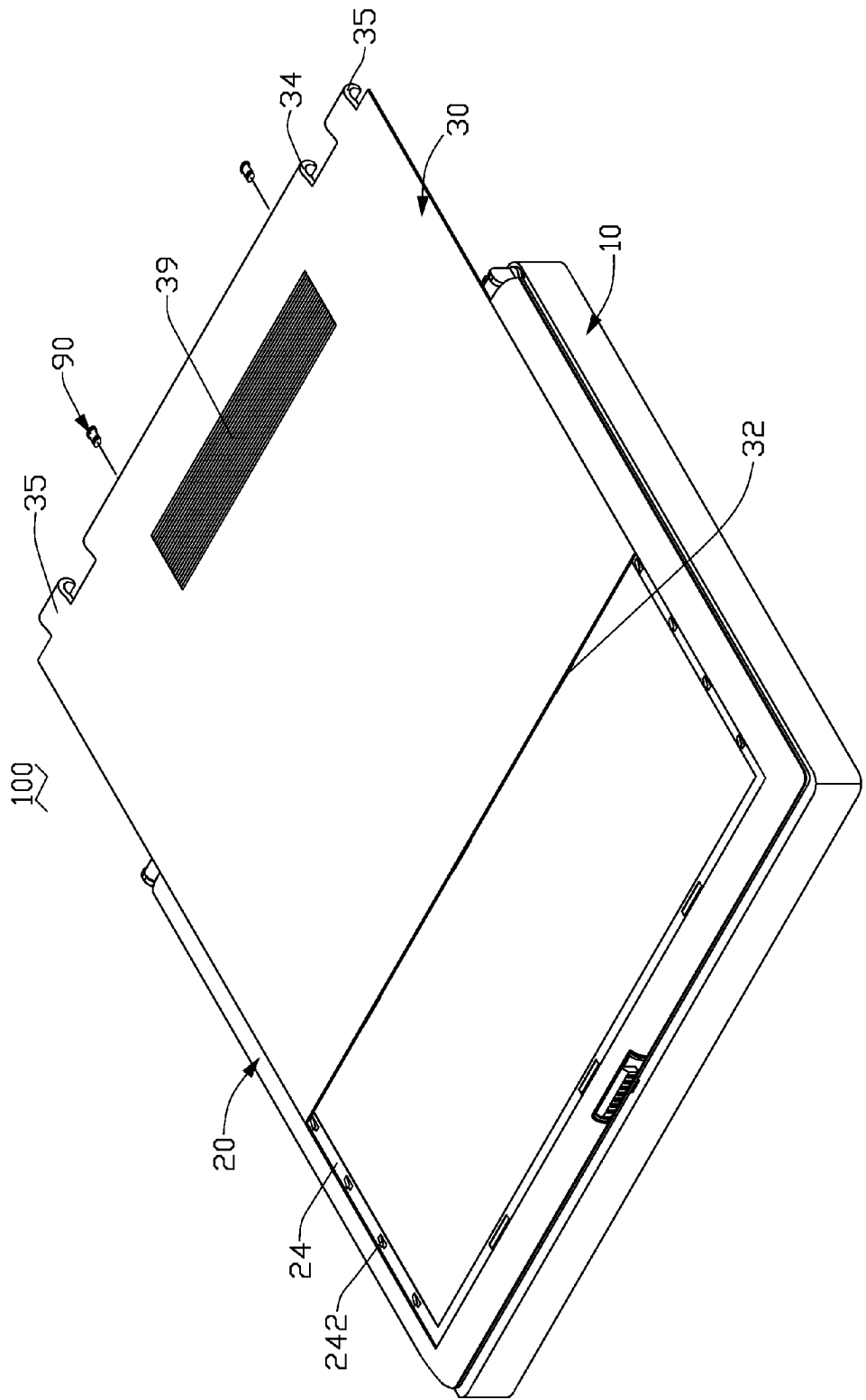
FIG. 4 is an isometric view of the portable computer, the outer plate of which is half assembled.
Figure 5:
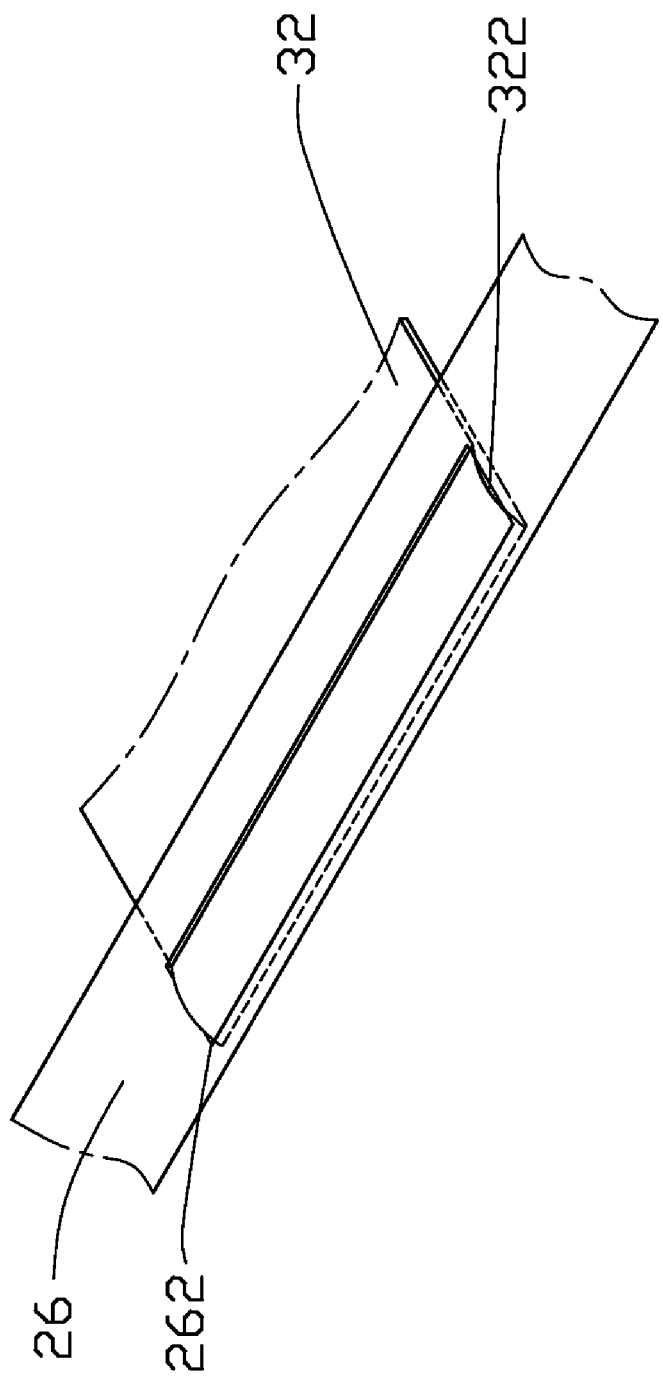
FIG. 5 is a partial view showing one of the latches engaging with the cover body.
Figure 6:
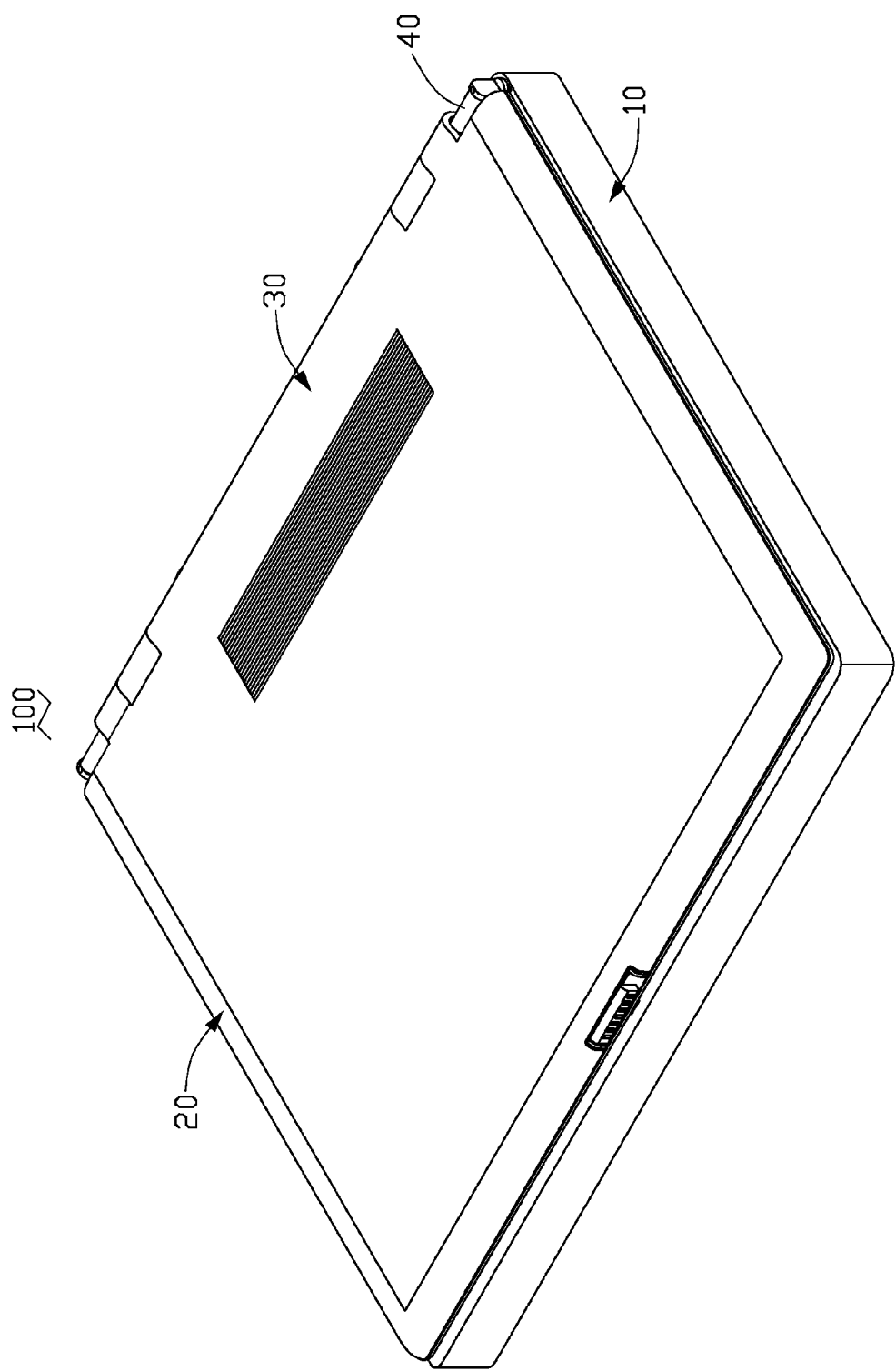
FIG. 6 is an isometric view of the portable computer, the outer plate of which is totally assembled.

Referring to FIGS. 4 through 6, an assembly procedure of the portable computer will be detailedly described. First, the outer plate 30 is mated to the cover body 20, with the inner surface facing the recess 21. The front portion of the outer plate 30 is placed to cover the back portion of the cover plate 20, and the outer plate 30 is moved forward along the side strips 24 with a force applied on the anti-slip strips 39 on the outer plate 30 until the protrusions 322 of the latches 32 of the outer plate 30 enter the openings 262 after deformation (as shown in FIG. 5). After the above steps, the front portion of the outer plate 30 is secured to the cover body 20, and the engaging flanges 35 engage with the engaging portions 28. Sequentially, a pair of screws 90 is screwed into the screw holes 222 in the cover body 20 via the through holes 342. Thus, the outer plate 30 is secured to the cover body 20 (as shown in FIG. 6). The resilient fingers 242 keep the outer plate 30 in firm contact with the cover body 20. When a user is ready to replace the outer plate 30 with a new outer plate, the screws 90 are removed and the latches 32 removed from the openings 262 to allow the outer plate 30 to move backward. After the outer plate 30 is removed from the cover body 20, the new outer plate is assembled to the cover body 20 according to the above steps of assembling the outer plate 30.

It is easy to replace the outer plate with a new outer plate (an appearance upgrade) to satisfy users' desire for a more modern looking portable computer without buying a brand-new portable computer. Furthermore, in order to anti-EMI (Electro-Magnetic Interference), an anti-EMI layer is coated to the inner surface of the outer plate 30.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A portable computer enclosure, comprising:
   a main body;
   a cover body pivotably attached to the main body; and
   an outer plate detachably attached to the cover body for covering the cover body;
   wherein the cover body defines a recess in an outer surface for receiving the outer plate, a mounting portion extends upward behind the recess for engaging with the outer plate, and at least one front strip extends in from a front of the recess, the mounting portion defines a screw hole therein, and the at least one front strip defines at least one opening therein;
   wherein the outer plate forms at least one latch at a front of an inner surface of the outer plate, the at least one latch forms a protrusion thereon to detachably engage in the at least one opening of the cover body, the outer plate forms a mounting flange at a back thereof, the mounting flange defines at least one through hole corresponding to the at least one screw hole of the main body, wherein the outer plate is slidable along a back-to-front direction in the recess to engage the at least one latch into the at least one opening, at least one screw is screwed into the at least one screw hole via the at least one through hole.

2. The portable computer enclosure as claimed in claim 1, wherein a pair of side strips extend in from lateral sides of the recess for restricting the back-to-front direction, each of the side strips comprises a plurality of resilient fingers applying restoration forces to the outer plate for keeping the cover body and the outer plate in contact with each other.

3. The portable computer enclosure as claimed in claim 2, wherein free ends of the resilient fingers extend forward and upward, and provide restoration forces when being pressed downward.

4. The portable computer enclosure as claimed in claim 1, wherein the cover body forms at least one engaging tongue, the outer plate forms at least one engaging flange, and the at least one engaging tongue and the at least one engaging flange are coupled to each other to define a pivot hole for pivotably receiving a shaft which is fixed to the main body.

5. The portable computer enclosure as claimed in claim 4, wherein the at least one latch and the at least one engaging flange are formed at opposite sides of the outer plate.

6. The portable computer enclosure as claimed in claim 1, wherein a plurality of anti-slip strips is formed at an outer surface of the outer plate for applying a force thereto to push the outer plate in a back-forth direction to engage or disengage the outer plate with or from the cover body.

7. The portable computer enclosure as claimed in claim 1, wherein a pair of shielding portions extends up from the back of the recess, adjacent to opposite sides of the mounting portion.

8. The portable computer enclosure as claimed in claim 7, wherein the mounting portion, side strips, the shielding portions, and engaging tongues surround the recess.

9. A portable computer, comprising:
   a main frame;
   a display pivotably attached to the main frame;
   a casing detachably secured to an outer surface of the display by at least one screw, the casing being detachable from the display by removing the at least one screw; and
   an anti-EMI layer coated on an inner surface of the casing;
   wherein a plurality of resilient fingers are integrally formed from the display in the vicinity of edges of the casing, for applying restoration forces to the casing and keeping the display and the casing in contact with each other,
   wherein the display defines at least one screw hole, the casing defines at least one through hole, and the at least one screw is screwed into the at least one screw hole via the at least one through hole, wherein a plurality of anti-slip strips is formed at an outer surface of the casing for applying a force thereto, wherein the display defines a recess at an outer surface receiving the casing therein.

10. The portable computer as claimed in claim 9, wherein the casing forms at least one latch with a protrusion thereon to engage in at least one opening defined in the display.

11. The portable computer enclosure as claimed in claim 10, wherein the display forms at least one engaging tongue, the casing forms at least one engaging flange, and the at least one engaging tongue and the at least one engaging flange are coupled to each other.

12. The portable computer enclosure as claimed in claim 11, wherein the at least one latch and the at least one engaging flange are formed at opposite sides of the casing.

13. A portable computer comprising:
   a main frame;
   a display pivotably attached to a back portion of the main frame; and
   a casing slidably attached to the display in back-and-forth directions for covering an outer side of the display opposing the main frame, one side of the casing forming at least one latch configured to detachably engage with the display thereby retaining the side of the casing to the display in the back-and-forth directions and up-and-down directions, an opposite side of the casing being fixed to the display via a fastener, wherein the display defines at least one opening, and the at least one latch of the casing comprises a protrusion integrally formed thereon, the at least one latch being deformable to allow the protrusion to engage in or disengage from the at least one opening, wherein the display comprises a plurality of resilient fingers extending outward therefrom for being compressed between the display and the casing in the up-and-down directions after the casing is attached to the display.

14. The portable computer as claimed in claim 13, wherein the fastener comprises at least one screw extending through holes defined in the display and the opposite side of the casing to fix the casing to the display.

* * * * *